United States Patent [19]

Maeda

[11] Patent Number: 4,510,534
[45] Date of Patent: Apr. 9, 1985

[54] STILL-MODE MAGNETIC REPRODUCING DEVICE

[75] Inventor: Masaya Maeda, Kanagawa, Japan

[73] Assignee: Canon Kabushiki Kaisha, Tokyo, Japan

[21] Appl. No.: 578,342

[22] Filed: Feb. 9, 1984

Related U.S. Application Data

[63] Continuation of Ser. No. 310,873, Oct. 13, 1981, abandoned.

[30] Foreign Application Priority Data

Oct. 13, 1980 [JP] Japan .................. 55-143242

[51] Int. Cl.³ .................. H04N 5/783; G11B 15/43
[52] U.S. Cl. .................. 360/10.3; 360/85; 360/95
[58] Field of Search .................. 360/10.1, 10.3, 74.1, 360/85, 95, 130.2

[56] References Cited

U.S. PATENT DOCUMENTS 3,825,944 7/1974 Terao .................. 360/95
3,969,766 7/1976 Tanaka .................. 360/85
4,035,842 7/1977 Terao .................. 360/85

OTHER PUBLICATIONS

Translation of Japanese Pat. No. 50-78209 (Tanaka), 11/16/73.

Primary Examiner—Alan Faber
Attorney, Agent, or Firm—Toren, McGeady and Stanger

[57] ABSTRACT

A helical scanning type magnetic reproducing device capable of still picture reproduction provided with a stop mechanism in operative engagement with a mechanism for effecting still picture reproducing operation so as to stop running of the tape and operative together with a tension device which imparts to the stopped magnetic tape a tension which is as strong as the tension during running of the tape.

31 Claims, 6 Drawing Figures

STILL-MODE MAGNETIC REPRODUCING DEVICE

This is a continuation of application Ser. No. 310,873, filed Oct. 13, 1981, now abandoned.

BACKGROUND OF THE INVENTION

1. Field of the Invention:

The present invention relates to a helical scanning type magnetic reproducing device for reading out picture information on a magnetic tape by means of a rotary magnetic head, particularly capable of still picture reproduction.

2. Description of the Prior Art:

In a conventional helical scanning type magnetic reproducing device the recording or the reproducing operation is carried out while a certain determined back tension is imparted to the magnetic tape wound around the tape guide drum in which a rotary head is provided.

The manner whereby back tension is imparted to the tape is well known in the art and a detailed explanation will not be provided herein. The most generally applied method involves, for example, braking of the feeding reel with a certain determined force. Furthermore, during a reproduction operation it is necessary to impart to the tape the same tension as during a recording operation so as to prevent distortion and to guarantee a certain determined pressure of the head upon the tape. For example, during ordinary reproduction operation, it is sufficient to impart to the feeding reel stand the same braking force as during recording operation. However, during still picture reproduction the tape stops running so that it is difficult to provide in the tape a certain determined back tension by means of the mechanism for braking the feeding reel. Consequently at the time of still picture reproduction the tension in the tape is changed as compared with during the time of the ordinary reproduction, thereby causing distortion which will curve the upper part of the picture plane or change in the pressure of the head on the tape which will adversely influence the picture quality.

SUMMARY OF THE INVENTION

With the aforementioned situation taken into consideration, the present invention is directed toward provision of a helical scanning type magnetic reproducing device which is free from distortion in the tape and which avoids change of the pressure of the head on the tape at the time of the still picture reproduction. More particularly a helical scanning type magnetic reproducing device is provided which includes stop means operatively engaged during still picture reproducing operation so as to stop running of the tape and tension means for imparting to the stopped tape a tension which is as strong as the tension during running of the tape.

The various features of novelty which characterize the invention are pointed out with particularity in the claims annexed to and forming part of this disclosure. For a better understanding of the invention, its operating advantages and specific objects attained by its use, reference should be made to the accompanying drawings and descriptive matter in which there is illustrated and described a preferred embodiment of the invention.

BRIEF DESCRIPTION OF THE DRAWINGS

FIGS. 1 and 2 are schematic views showing an embodiment of the magnetic recording device, wherein FIG. 1 shows the device in the loading state, while FIG. 2 shows the device in the unloading state.

FIGS. 3 to 6 show important parts of the present invention, wherein FIG. 3 shows the loading state in plan view, FIG. 4 shows the unloading state in plan view, FIG. 5 shows the loading state in perspective view and FIG. 6 indicates in a schematic view the operation at the time of still picture reproduction.

DETAILED DESCRIPTION OF THE PREFERRED EMBODIMENT

Figure 1:
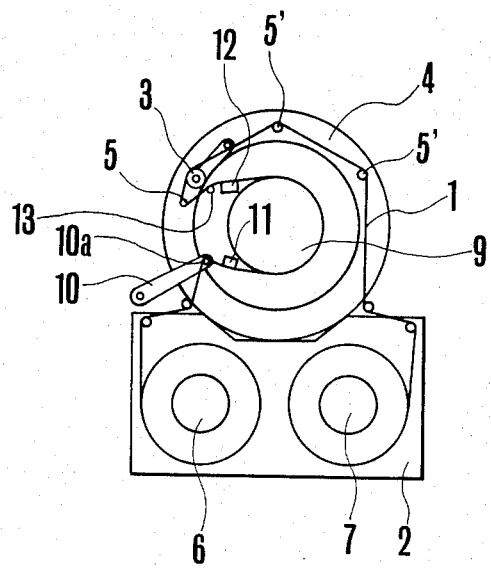
Figure 2:
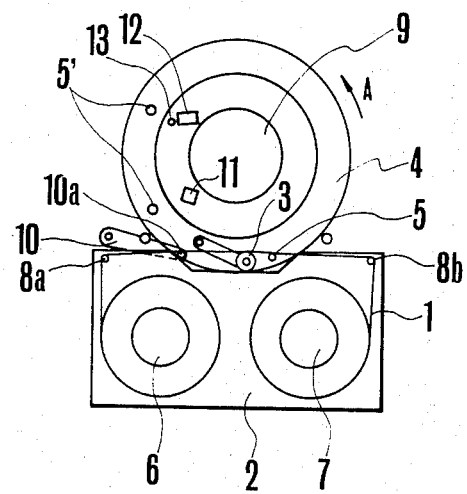

FIGS. 1 and 2 show a magnetic recording—reproducing device to which the present invention can be applied. FIG. 1 shows the device with the tape pulled out of the tape loading cassette and wound around the tape guide drum, whereby recording and reproducing operation is possible. FIG. 2 shows the state device before the tape is pulled out of the cassette.

In the drawing, a magnetic tape 1 is provided within a cassette 2 including a feeding reel 6 for feeding the tape 1 and a winding reel 7 for winding the tape 1. A tape guide drum 9 having a rotary magnetic head is provided, and a loading ring 4 operates upon rotation thereof in a first direction to load the tape 1 on the drum 9 and by rotation thereof in the reversed direction to unload the tape. The ring 4 is provided with a tape pull out pin 5, a tape guide pin 5' and a pinch roller 3. A tape pull out arm 10 is provided for pulling the tape out of the casette during loading operation of the ring 4. A pull out pin 10a is provided on the pull out arm 10 and a CTL round head 11 effects recording—reproducing of the control signal and the sound signal. An all width erasing head 12 is provided for erasing the picture, the sound and the control signal on the magnetic tape and a capstan roller 13 is provided for driving the tape at a constant speed.

The loading and the unloading operation of the tape is well known in the art and in the tape unloading state shown in FIG. 2, the tape 1 reaches the winding reel from the feeding reel through guide pins 8a and 8b in the cassette 2.

At this time, the pinch roller 3, the tape pull out pin 5 and the tape pull out arm 10 are positioned inside of the cassette, whereby the tape 1 is located between these members and the tape guide drum 9 in which the rotary magnetic head is provided. The loading operation is effected when the loading ring 4 is rotated in the direction of the arrow A by means of a driving source such as a motor.

By operation of the pinch roller 3 and the tape pull out pin 5, the tape 1 is pulled out the cassette 2, and the tape guide pin 5 is successively moved in such a manner that the tape 1 is wound around the tape guide drum 9 from the right side as viewed in the drawing. At the same time, the pull out arm 10 including at its end a pull out pin 10a is rotated in the counter-clockwise direction in operative engagement with the loading ring 4 so as to bring the tape 1 in contact with the all width erasing head 11, whereby at the same time, the pull out arm 10 acts as the tension arm for importing a proper back tension to the tape 1.

When the tape 1 has been wound within a certain determined angle around the tape guide drum 9, the loading ring 4 stops rotating so as to complete the loading. At this time, the pinch roller 3 is in the neighborhood of the capstan roller 13 and is pressed against the capstan roller 13 in order to effect driving of the tape pressed therebetween. At this time, the tape pull out pins 5, 10a and the guide pin 5' act as guides for causing the tape 1 to run along a certain determined path.

As explained above, the present invention relates to a mechanism for effecting a desired tension in the tape when a still picture is reproduced with the helical scanning type magnetic recording—reproducing device.

FIGS. 3 to 6, wherein similar reference numerals are used to identify similar elements as those in FIGS. 1 and 2, show the device in greater detail.

Figure 5:
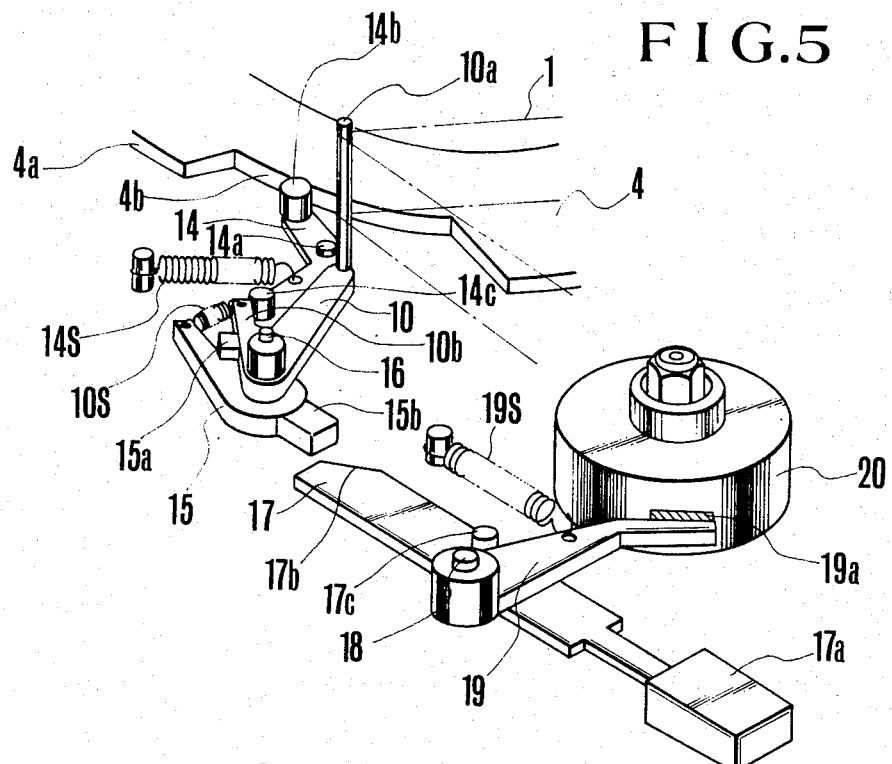

The end of the tape pull out arm 10 opposite the end where the tape pull out pin 10a is provided is rotatably supported on a shaft 16 provided on a base plate (not shown in the drawing) together with a lever 15, as is shown in detail in FIG. 5. The lever 15 is intended to provide a certain determined back tension when a still picture is reproduced, and it is connected to the base plate by means of a spring not shown in the drawing so as to be urged along in the clockwise direction. This lever 15 is elastically connected to the tape pull out arm 10 by means of a spring 10S, in such a manner that the pull out arm 10 is normally in contact with a stopper 15a formed on the lever 15 by means of the spring 10S.

Consequently, the pull out arm 10 is urged in the clockwise direction together with the lever 15, and its rotation is prohibited by a stop pin 14c engaged with the engaging portion 10b formed on the pull out arm 10. The stop pin 14c is provided at one end of an L-shaped operation lever 14 rotatably supported on a shaft provided on the base plate. This operation lever 14 is urged in the clockwise direction by means of a spring 14S, whereby rotation is prohibited because a pin 14b provided at the other end is in contact with the circumference 4a of the loading ring 4.

Thus, the position of the pull out lever 10 is controlled by means of the operation lever 14.

Figure 4:
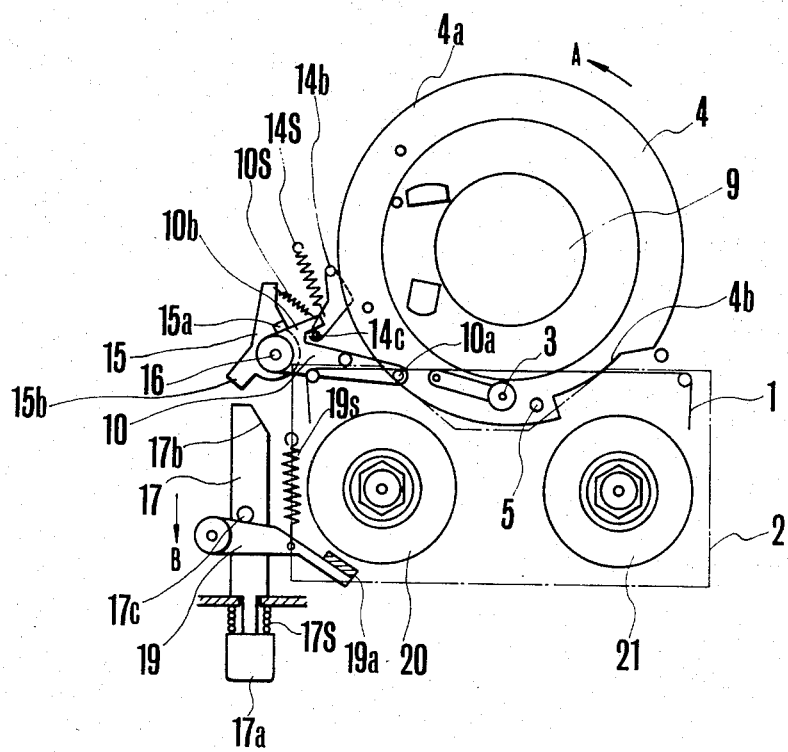

FIG. 4 shows the device in the unloading state. In this state, the position of the tape pull out pin 10a of the tape pull out arm 10 is controlled by means of the operation lever 14 in such a manner that the pull out pin 10a is inside of the tape 1 in the cassette, as is shown in the drawing. When the loading ring 4 is rotated the tape 1 is pulled out of the cassette 2 by means of the pinch roller 3 and the tape pull out pin 5 and is thereby wound around the tape guide drum 9. At a certain determined position on the circumference 4a of the loading ring 4, a concave portion 4b is formed in such a manner that during the loading operation the pin 14b of the operation lever 14 is drawn into the concave portion 4b by means of the spring 14S. Thus, the lever 14 is rotated in the clockwise direction so as to rotate the tape pull out arm 10 engaged with the stop pin 14a against the clockwise strength of the lever 15.

Figure 3:
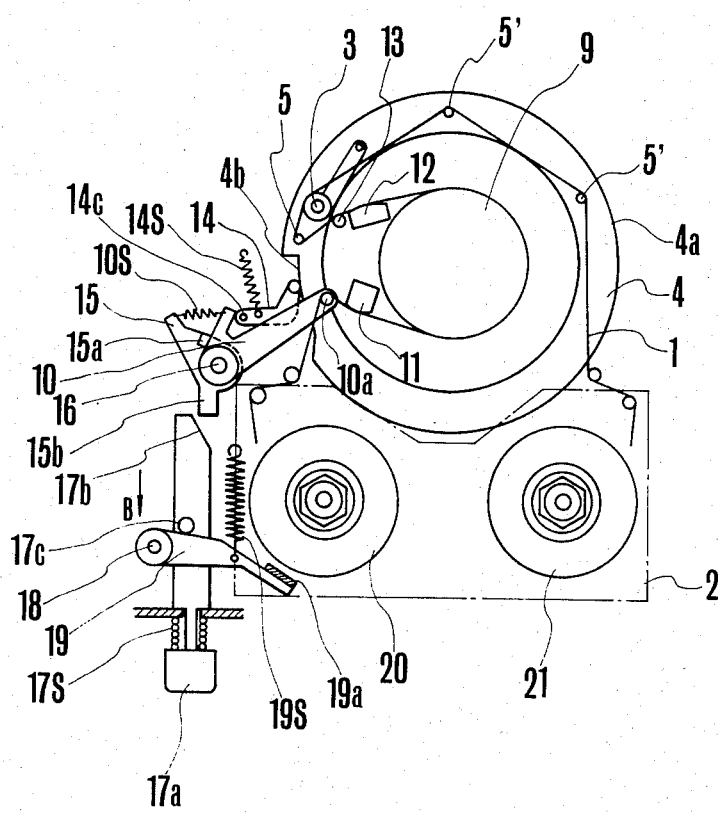

Along with counter-clockwise rotation of the arm 10 the tape 1 is pulled out into a certain determined position by means of the tape pull out pin 10a. FIG. 3 shows the state in which the loading has been completed, whereby the tape 1 is made to run in accordance with a selected mode of operation for recording or reproducing by means of the pinch roller 3 and the capstan roller 13 in such a manner that recording or reproducing is effected by means of the rotary head provided in the tape guide drum 9.

A still picture reproducing slider 17 having at one end thereof a still picture reproducing button 17a (hereinafter called still button) is provided. A brake lever 19 for stopping rotation of the feeding reel stand is rotatably supported on the shaft 18 and is urged in the counter-clockwise direction by means of a spring 19S. The slider 17 is normally urged by means of a spring 17S in the direction of the arrow B in FIG. 3 in such a manner that the still button 17a is projected out of the device. In this state by means of the pin 17c provided on the slider 17 the brake lever 19 is pressed downwardly against the force of the spring 19S in such a manner that the brake pad 19a provided at one end of the brake bar 19 is prohibited from being in contact with the feeding reel stand 20. On the lever 15, an operation portion 15b is formed which will be located at a position opposed to the upper end of the slider 17 when loading has been completed as is shown in FIG. 3.

Figure 6:
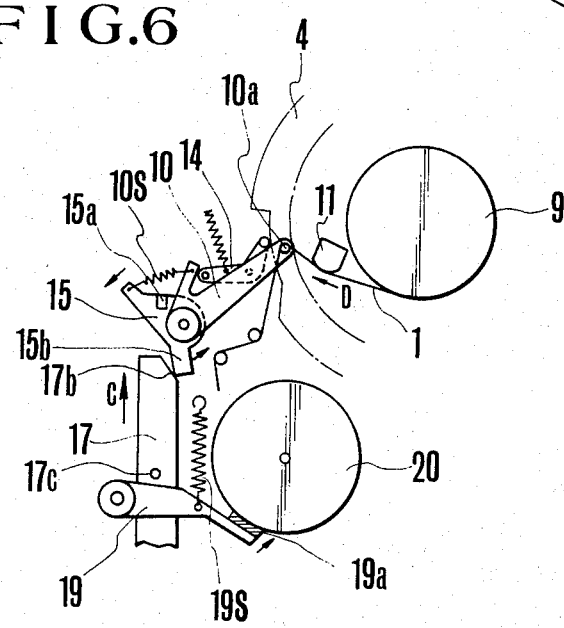

Formed at the upper end of the slider 17 is an inclined face 17b arranged in such a manner that when the slider is moved in the direction of the arrow C in FIG. 6 the inclined face 17b is engaged with the operation part 15b so as to rotate the lever 15 in the counter-clockwise direction around the shaft 16.

In the operation of the device of the invention, when during the normal reproducing process the still button 17a is pressed, the slider 17 is moved in the direction of the arrow C in FIG. 6. Along with the motion of the slider 17 a switch not shown in the drawing operates so as to stop driving of the capstan roller 13 in order to stop the running of the tape.

At the same time, as is shown in FIG. 6 the brake lever 19 is freed from the position controlled by the stop pin 17c of the slider 17 and is rotated in the counter-clockwise direction to bring the brake pad 19a in strong contact with the circumference of the feeding reel stand 20 to effect braking thereof. Along with the motion of the slider 17, the inclined surface 17b formed on the upper end thereof comes into contact with the operation part 15b of the lever 15 so as to rotate the lever in the counter-clockwise direction. Because at this time the feeding reel stand 20 is secured by means of the brake pad 19a, the feeding of the tape 1 is prohibited (the feeding reel 6 does not rotate) so that the position of the tape pull out pin 10a hardly changes, and only the lever 15 rotates.

Consequently, the pull out arm 10 is urged by means of the spring 10S in the counter-clockwise direction so that by means of the tape pull out pin 10a a tension in the direction of the arrow D is imparted to the tape 1. Thus, at the time of still picture reproduction a back tension is imparted to the tape 1 by means of the spring 10S along with the rotation of the lever 15. Consequently, by properly sitting the range in which the lever 15 rotates along with the motion of the slider 17 or the strength of the spring 15, a back tension which is as strong as that during the running of the tape can be imparted to the tape even when the tape stops running at the time of still picture reproduction.

The mechanism for imparting tension at the time of still picture reproduction is operated by means of the slider 17. However, the present invention is not thus limited and the electrical circuit can be changed over by means of electromechanical elements such as a solenoid.

Further, the feeding reel is stopped and a back tension in a direction opposite that of the running direction of the tape is given to the tape between the feeding reel and the drum, while a tension in the tape running direction can be given to the tape between the drum and the winding reel by stopping the winding reel.

Further, in case of the present embodiment the rotation of the feeding reel is stopped with still picture reproducing operation, whereby any other method which stops the running of the tape will do.

Further, in case of the present embodiment, although the device described is capable of both modes, namely the recording mode and the reproducing mode, the present invention can be applied to a device which has only the reproducing mode to effect still picture reproducing efficiency.

As explained in detail so far, the present invention relates to a helical scanning type magnetic reproducing device capable of still picture reproduction, provided with brake means acting in operative engagement during still picture reproducing operation and tension means for imparting the stopped film a tension as strong as that during running of the tape. In this way, it is possible to impart to the film at the time of still picture reproduction a tension which is as strong as that during ordinary reproduction by means of a remarkably simple construction, so that distortion is prevented in the tape at the time of still picture reproduction which might curve the upper part of the picture and to prevent change in the pressure of the head on the tape which might deteriorate the picture quality. Thus, even at the time of still picture reproduction, a picture of a quality as good as that provided during ordinary reproduction can be obtained.

While a specific embodiment of the invention has been shown and described in detail to illustrate the application of the inventive principles, it will be understood that the invention may be embodied otherwise without departing from such principles.

What is claimed is:

1. A reproduction device for reproducing picture information on a tape in a cassette, comprising:
    a tape guide body having a reproducing rotary head and guiding said tape;
    tape loading means for pulling said tape out of said cassette and for winding said tape around said guide body, including first and second tape pullout pins for pulling said tape out of said cassette when in contact with said tape;
    a loading ring rotatable around the tape guide body for moving said first tape pullout pin;
    a loading member attached with said second tape pullout pin;
    a moving member for moving said loading member in response to the rotation of said loading ring so as to move said second tape pullout pin in a direction different from said first tape pullout pin;
    operation means for instructing still picture reproduction;
    tape feeding means for feeding the tape at a constant speed and to stop the tape feeding operation in response to operation of said operation means;
    prohibition means for prohibiting the supplying of the tape out from the cassette and rewinding of the tape in response to operation of the operation means; and
    tension means for increasing the spring force given to the second guide pin so as to impart tension to the tape between the guide body and the cassette in response to operation of the operation means.

2. A reproduction device according to claim 1 wherein said tension means has a spring member for urging said loading member.

3. A reproducing device according to claim 2 wherein said tension means has a stopper which prohibits urging by said spring member when said operation member does not operate.

4. A reproducing device according to claim 2 wherein said spring member is a coil spring having one end thereof attached to said loading member.

5. A reproducing device according to claim 4 further comprising a mounting member for mounting the other end of said spring.

6. A reproducing device according to claim 5 further comprising separating means for separating said mounting members from said second guide pin.

7. A reproducing device according to claim 6 wherein said separating means are operated in response to operation of said operation means.

8. A reproducing device according to claim 7 wherein said operating means includes a movable member to be moved with operation thereof.

9. A reproducing device according to claim 8 wherein said separating means separates said second guide pin from said mounting member along with movement of said movable member.

10. A reproducing device according to claim 5 wherein said mounting member and said loading member rotate around the same center.

11. A reproducing device according to claim 1 which further comprises a reel base for rotating a reel of said cassette, and a braking member for stopping rotation of said reel, wherein said prohibition means activates said braking member.

12. A reproducing device according to claim 11 which further comprises a stopper which prohibits actuation of said braking member when said operating means does not operate.

13. A reproducing device according to claim 1 wherein said tape is a magnetic tape and said reproducing rotary head is a magnetic head.

14. A reproduction apparatus for reproducing picture information on a tape, comprising:
    a tape guide body having at least a reproducing rotary head and guiding the tape;
    operation means for instructing still picture reproduction;
    tape feeding means for feeding the tape at a constant speed, said feeding means stopping the tape feeding operation in response to operation of said operation means;
    tension control means for controlling the tension of said tape around said body to maintain it constant when said tape is fed by said feeding means at a constant speed; and
    compensation means for compensating changes of said tension caused when said tape is stopped by operation of said operation means.

15. A reproduction apparatus according to claim 14 wherein said tension control means includes a guide pin adapted to contact with said tape so as to control the tension therein, said compensation means including urging means for urging said guide pin.

16. A reproduction apparatus according to claim 15 further comprising prohibition means for prohibiting the action of said urging means when said operation means is not operated.

17. A reproduction apparatus according to claim 15 in which the urging means is a coil spring.

18. A reproduction apparatus according to claim 17 further comprising a mounting member for mounting an end of said spring.

19. A reproduction apparatus according to claim 18 further comprising separating means for separating said mounting members from said guide pin.

20. A reproduction apparatus according to claim 19 wherein said separating means are operated in response to operation of said operation means.

21. A reproduction apparatus according to claim 20 wherein said operating means includes a movable member to be moved with operation thereof.

22. A reproduction apparatus according to claim 14 including a tape supply reel further comprising a reel base for rotating said tape supply reel, and a braking member for stopping rotation of said reel in response to operation of said operation means.

23. A reproduction apparatus according to claim 22 further comprising a stopper which prohibits actuation of said braking member when said operating means does not operate.

24. A reproduction apparatus according to claim 14 wherein said tape is a magnetic tape and said reproducing rotary head is a magnetic head.

25. A reproduction apparatus for reproducing picture information on a tape, comprising:
a tape guide body having at least a reproducing rotary head and guiding the tape;
operation means for instructing still picture reproduction;
tape feeding means for feeding the tape at a constant speed, said feeding means stopping the tape feeding operation in response to operation of said operation means;
urging means for imparting tension to said tape; and
urging force control means for maintaining the tape tension at the time when the tape is stopped and when it is running by changing the urging force of said urging means in response to operation of said operation means.

26. A reproduction apparatus according to claim 25 wherein said urging means includes a guide pin adapted to contact with said tape, and bias means for biasing said guide pin,
said urging force control means operating to change the biasing force of said bias means in response to operation of said operation means.

27. A reproduction apparatus according to claim 26 wherein said bias means comprises two bias members, and wherein said urging force control means renders inoperative one of said bias members when said operation means does not operate.

28. A reproduction apparatus according to claim 25 further comprising supply means for supplying said tape to said guide body, and prohibition means for prohibiting the supply of said tape by said supply means in response to operation of said operation means.

29. A reproduction apparatus for reproducing picture information on a tape, comprising:
a tape guide body having at least a reproducing rotary head and guiding the tape;
operation means for instructing still picture reproduction;
tape feeding means for feeding the tape at a constant speed, said feeding means stopping the tape feeding operation in response to operation of said operation means;
a guide pin adapted to contact said tape, first urging means for imparting a first urging force to said guide pin, and second urging means for imparting a second urging force to said guide pin; and
control means for maintaining said tape under constant tension when said tape is stopped and when it is running by urging said guide pin by the second urging means in response to operation of the operation means.

30. A reproduction apparatus according to claim 29 further comprising supply means for supplying said tape to said guide body, and prohibition means for prohibiting tape supply by said supply means in response to operation of said operation means.

31. A reproduction apparatus according to claim 30 wherein said supply means is a reel base for rotating a tape supply reel, said prohibition means is a stopper for stopping said reel.

* * * * *